US012280904B2

United States Patent
Ronchi (10) Patent No.: US 12,280,904 B2
(45) Date of Patent: Apr. 22, 2025

(54) PICK AND PLACE DEVICE FOR AN APPARATUS FOR FILLING AND CLOSING ARTICLES

(71) Applicant: RONCHI MARIO S.p.A., Milan (IT)

(72) Inventor: Cesare Ronchi, Milan (IT)

(73) Assignee: RONCHI MARIO S.P.A., Milan (IT)

( * ) Notice: Subject to any disclaimer, the term of this patent is extended or adjusted under 35 U.S.C. 154(b) by 322 days.

(21) Appl. No.: 17/755,518

(22) PCT Filed: Oct. 29, 2020

(86) PCT No.: PCT/IB2020/060128
§ 371 (c)(1),
(2) Date: Apr. 29, 2022

(87) PCT Pub. No.: WO2021/084451
PCT Pub. Date: May 6, 2021

(65) Prior Publication Data
US 2022/0380077 A1 Dec. 1, 2022

(30) Foreign Application Priority Data

Oct. 30, 2019 (IT) .......................... 102019000020034
Oct. 30, 2019 (IT) .......................... 102019000020046
(Continued)

(51) Int. Cl.
*B65B 43/46* (2006.01)
*B25J 9/00* (2006.01)
(Continued)

(52) U.S. Cl.
CPC ................. *B65B 43/46* (2013.01); *B25J 9/00* (2013.01); *B25J 9/0084* (2013.01); *B25J 9/0093* (2013.01);
(Continued)

(58) Field of Classification Search
CPC ....... B65B 43/46; B65B 59/003; B65B 57/10; B25J 9/0084; B25J 9/0093; B25J 15/0033
See application file for complete search history.

(56) References Cited

U.S. PATENT DOCUMENTS

| 5,172,951 A | 12/1992 | Jacobsen et al. |
| 2011/0030320 A1 | 2/2011 | Blumenstock et al. |

(Continued)

FOREIGN PATENT DOCUMENTS

| JP | H06305551 A | 11/1994 |
| WO | 2009130112 A1 | 10/2009 |

(Continued)

OTHER PUBLICATIONS

ISA European Patent Office, International Search Report Issued in Application No. PCT/IB2020/060128, Feb. 9, 2021, WIPO, 6 pages.
(Continued)

*Primary Examiner* — Andrew M Tecco
*Assistant Examiner* — Nicholas E Igbokwe
(74) *Attorney, Agent, or Firm* — McCoy Russell LLP (57) ABSTRACT

Pick and place device for an apparatus for filling and closing articles in particular, containers, comprising a robotic arm, a free end of which carries a gripper formed by two claws arranged opposite each other and movable towards and away from each other so as to open and close the gripper. Each claw defines a first jaw configured to form with the first opposite first jaw a first gripper for gripping a closing element designed to be applied onto an article and a second jaw configured to form, with the opposite second jaw a second gripper for gripping the article.

15 Claims, 3 Drawing Sheets

(30) Foreign Application Priority Data

Oct. 30, 2019 (IT) .................. 102019000020074
Oct. 30, 2019 (IT) .................. 102019000020080

(51) Int. Cl.

| | |
|---|---|
| B25J 15/00 | (2006.01) |
| B25J 15/04 | (2006.01) |
| B65B 1/04 | (2006.01) |
| B65B 3/04 | (2006.01) |
| B65B 5/04 | (2006.01) |
| B65B 7/28 | (2006.01) |
| B65B 35/16 | (2006.01) |
| B65B 35/24 | (2006.01) |
| B65B 57/00 | (2006.01) |
| B65B 57/10 | (2006.01) |
| B65B 59/00 | (2006.01) |
| B65B 59/04 | (2006.01) |
| B65B 65/00 | (2006.01) |
| B67C 7/00 | (2006.01) |
| B65B 11/00 | (2006.01) |

(52) U.S. Cl.

CPC .......... *B25J 15/0033* (2013.01); *B25J 15/04* (2013.01); *B65B 1/04* (2013.01); *B65B 3/04* (2013.01); *B65B 5/04* (2013.01); *B65B 7/28* (2013.01); *B65B 7/2807* (2013.01); *B65B 35/16* (2013.01); *B65B 35/24* (2013.01); *B65B 57/00* (2013.01); *B65B 57/10* (2013.01); *B65B 59/003* (2019.05); *B65B 59/04* (2013.01); *B65B 65/003* (2013.01); *B67C 7/002* (2013.01); *B65B 11/00* (2013.01)

(56) References Cited

U.S. PATENT DOCUMENTS

| | | | |
|---|---|---|---|
| 2012/0153652 | A1 | 6/2012 | Yamaguchi et al. |
| 2012/0207574 | A1* | 8/2012 | La Rovere ........... B25J 15/0616 414/751.1 |
| 2014/0331618 | A1* | 11/2014 | Guggisberg ............. B65B 7/28 53/287 |
| 2014/0373662 | A1* | 12/2014 | Umeno ................ B25J 15/0052 901/31 |
| 2015/0274436 | A1 | 10/2015 | Di Donna et al. |
| 2018/0065208 | A1 | 3/2018 | Mori et al. |
| 2018/0075506 | A1* | 3/2018 | Burkhard ............... B65G 23/23 |
| 2018/0189275 | A1* | 7/2018 | Procyshyn ........... B65B 7/2821 |
| 2019/0079106 | A1* | 3/2019 | Brisebrat ........... G01N 35/0099 |
| 2019/0111575 | A1 | 4/2019 | Asano et al. |
| 2019/0315004 | A1* | 10/2019 | Bechini ................. B25J 21/005 |

FOREIGN PATENT DOCUMENTS

| | | |
|---|---|---|
| WO | 2014064592 A2 | 5/2014 |
| WO | 2015169863 A1 | 11/2015 |

OTHER PUBLICATIONS

ISA European Patent Office, Written Opinion of the International Searching Authority Issued in Application No. PCT/IB2020/060128, Feb. 9, 2021, WIPO, 7 pages.

\* cited by examiner

PICK AND PLACE DEVICE FOR AN APPARATUS FOR FILLING AND CLOSING ARTICLES

CROSS REFERENCE TO RELATED APPLICATIONS

The present application is a U.S. National Phase of International Application No. PCT/IB2020/060128 entitled "PICK AND PLACE DEVICE FOR AN APPARATUS FOR FILLING AND CLOSING ARTICLES, APPARATUS AND METHOD FOR FILLING AND CLOSING RANDOMLY FED ARTICLES," and filed on Oct. 29, 2020. International Application No. PCT/IB2020/060128 claims priority to Italian Patent Application No. 102019000020034 filed on Oct. 30, 2019, Italian Patent Application No. 102019000020046 filed on Oct. 30, 2019, Italian Patent Application No. 102019000020074 filed on Oct. 30, 2019, and Italian Patent Application No. 102019000020080 filed on Oct. 30, 2019. The entire contents of each of the above-listed applications are hereby incorporated by reference for all purposes.

TECHNICAL FIELD

A modular apparatus for filling and closing randomly fed articles, in particular containers, a method for filling and closing randomly fed articles and a plant for packaging articles such as containers, including one or more of said modular apparatus.

BACKGROUND AND SUMMARY

It is known that, in the technical sector relating to the packaging of products, for example in liquid, fluid or powder form, there exists the need to handle articles, in particular containers, which have different capacities and forms and which are fed to automatic operating machines such as filling, capping, and labelling machines, each respectively designed to fill, close, label, or subsequently forward the articles/products for packaging.

It is also known that these automatic machines must generally be fed continuously, at regular intervals and/or at a predefined constant speed, namely in accordance with parameters determined by the requirements of the machines and by the production cycle for which they are designed and configured.

In addition, it may also be required that the containers should arrive at the automatic operating machines always in a certain—generally upright—position, i.e. with the filling opening directed upwards and/or with a specific orientation of their surfaces (conventionally identified as being front, side or rear relative to a longitudinal axis, the position of the filling mouth and/or the advancing direction through the machine), so as to allow correct handling of the article, for example during the filling and labelling operations.

In this context, the packaging plants generally comprise a plurality of apparatus and machines comprising feeding apparatus—conventionally called sorting apparatus—which, starting with articles, such as containers arranged randomly in special hoppers—are able to sort and feed the containers in an ordered sequence and/or with a predefined orientation and/or position (e.g. erect position) to subsequent filling machines in which the containers are filled with the product and subsequently transported to capping apparatus for the application of a closing element, such as a cap, on each filled container. Downstream of the capping station there may be further machines, such as labelling machines, scales for checking the weight of the packaged product and/or automatic packaging machines.

The known packaging plants have hitherto been designed with the aim of maximizing the production capacity, the speed for sorting, filling and capping the articles, and the efficiency of handling of said articles, with the aim of achieving maximum productivity during mass production.

For this purpose, the plants are generally custom-designed and built according to the capacity and production requirements of the client, with a series of apparatus and machines arranged in series and configured to process with the maximum efficiency and speed certain specific types of articles and to operate with a given predetermined production capacity.

One problem which has recently emerged is that resulting from the fact that the known packaging plants are not versatile with regard to the management of different production volumes or types of production.

In fact, if the demand for the type of article for which the plant is designed is less than that for which it has been configured, it is required to interrupt operation of the plants once production reaches the desired level.

Any changes in format of the articles to be handled and/or products to be dispensed require at least the intervention of specialized operators, washing of the apparatus, and often also reconfiguration of the machine by the installation company.

In addition, if instead it is required to increase the production capacity of the installed plant, the only solution is to install a new plant in order to meet the excess demand which cannot be guaranteed by the packaging plant which has already been installed.

The same aforementioned drawbacks also have repercussions on the manufacturers of the packaging plants, in particular of the filling and capping lines, who are generally obliged to design and construct each plant based on the specific production requirements and type of articles specified by the clients; as a result, the production of the packaging plants and in particular the sorting, filling, and capping lines may be standardized only with regard to the more general aspects, but each plant must be subsequently designed and configured in each case with a huge investment in terms of time and technical and economic resources.

In the aforementioned context and in order to maximize the production capacity and the speed of packaging of the articles, the automation of the plants, in particular of the sorting apparatus, must be limited, since more complex and therefore highly automated apparatus work more slowly than simple apparatus which must not perform automatically complex operations or movements.

In this context, so-called pick and place devices are known, these being used during the sorting of the randomly fed empty articles, so as to create a flow of ordered and oriented articles which advances towards successive downstream apparatus for filling and closing the articles. These successive apparatus are instead generally fed by rotary star wheels with suitably sized seats and/or conveyor belts.

A further problem is that the known plants occupy a large space in particular lengthwise and, as mentioned, once installed, they cannot be easily removed or adapted to a reduction of or change in the production requirement.

A particular object of the present disclosure is to provide pick and place devices for use during the sorting, filling, and closing of articles, in particular containers, which are able to make the associated apparatus more versatile as regards variations in the volume and/or type of production required. This improved versatility may be desirable during design and construction of the apparatus and/or during production when the apparatus has been installed.

A further desirable aspect is that the pick and place devices should allow the provision of an article filling and closing apparatus which has small dimensions, is easy and low-cost from a production and assembly point of view, and may be easily installed at any user location.

These results are obtained according to the present disclosure by a pick and place device for an apparatus for sorting, filling, and closing articles, in particular containers, the device comprising a robotic arm, a free end of which carries end means, in particular gripping means, the robotic arm may be of the anthropomorphic type, in particular with at least five and, in some embodiments, at least six axes of rotation and/or degrees of freedom. The end means comprise gripping means with a gripper composed of two claws arranged opposite each other and movable towards and away from each other so as to open and close the gripper, wherein each claw defines a first jaw configured to form with the opposite first jaw means for gripping a closing element and a second jaw configured to form, with the opposite second jaw, means for gripping an article such as in particular a container to be filled.

The pick and place device according to the disclosure is extraordinarily versatile, being provided with ample freedom for movement and handling of articles or closing elements, and allows a variety of operations to be performed, including in particular: picking up a randomly fed closing element C (for example a cap), re-orienting it if necessary and feeding it with a certain orientation to a filling station configured to apply it to an article to be capped, holding an article in a given position, for example a filling position in a filling station for at least part of a product filling operation, but also moving a filled article from a filling station to a closing station, or from the latter to an extraction system.

During use in a filling and closing apparatus, the device according to the disclosure therefore makes it possible to avoid the need to provide specific means for holding and moving the containers into/between the filling and closing stations and from the latter to the extraction system, also allowing the design of filling and closing apparatus which are more versatile, but also more compact, where lines for sorting and spacing between stations are no longer being necessary.

In some embodiments, opening and closing of the gripper is adjustable to different positions by means for displaceably operating one or both the claws. The closing force of the gripper may also be adjustable by means for operating one or both the claws.

According to an embodiment, the free end of the robotic arm is configured for autonomous replacement of the end means in the form of gripping means with different end means, for example controllable by means of a processing unit. In particular, it is possible to replace the gripping means with a collector, in particular in the form of a small cup, for collecting a washing fluid of a filling station, and/or with different gripping means designed to define jaws with a different size and/or form for gripping and positioning a different article and/or closing element. It is therefore also proposed here to provide a kit comprising a device with a robotic arm suitable for coupling/decoupling with end means, and a plurality of different end means which the device may replace autonomously.

The pick and place device according to the disclosure may be programmed to implement, during use in a filling and closing apparatus, one or more, or all, of the following operations:
  pick up a closing element randomly arranged on a transport plane and feed it to application means of a closing station;
  hold an article A in a filling position in a filling station;
  displace a filled article A from a filling station into a closing position in a closing station;
  hold an article in the closing position during application of a closing element;
  displace a filled and closed article from a closing position in the closing station into a given position and/or orientation for extraction on an extraction plane.

The present disclosure relates furthermore to a modular apparatus for filling and closing randomly fed articles, in particular containers, by means of closing elements also fed randomly, which includes one or more pick and place devices according to the present disclosure.

Such a configuration of modular apparatus allows the production of plants with different capacities for sorting, filling, and capping articles such as containers to be filled with a fluid, using always a same modular structure of the filling and capping apparatus and simply combining a suitable number of such apparatus in series along the extraction direction in order to obtain the necessary production capacity. Likewise, it is possible to vary the capacity of a plant which includes an apparatus according to the disclosure which has previously been installed simply by adding (or removing) further filling and capping modules upstream or downstream thereof in the longitudinal direction.

Also in connection with plants which have already been installed, it is also possible, owing to the modular structure of the apparatus according to the disclosure, to vary the production capacity of the plant depending on the actual needs by operating only one or more of the filling and capping modules which are independent of each other; alternatively or in combination it is also possible to realize different types of production using the various filling and capping modules arranged along the same extraction line.

BRIEF DESCRIPTION OF THE FIGURES

Further details may be obtained from the following description of non-limiting examples of embodiment of the subject of the present disclosure provided with reference to the case where the articles to be sorted are containers, such as bottles containing a product, and to the attached drawings, in which.

DETAILED DESCRIPTION

Figure 1:
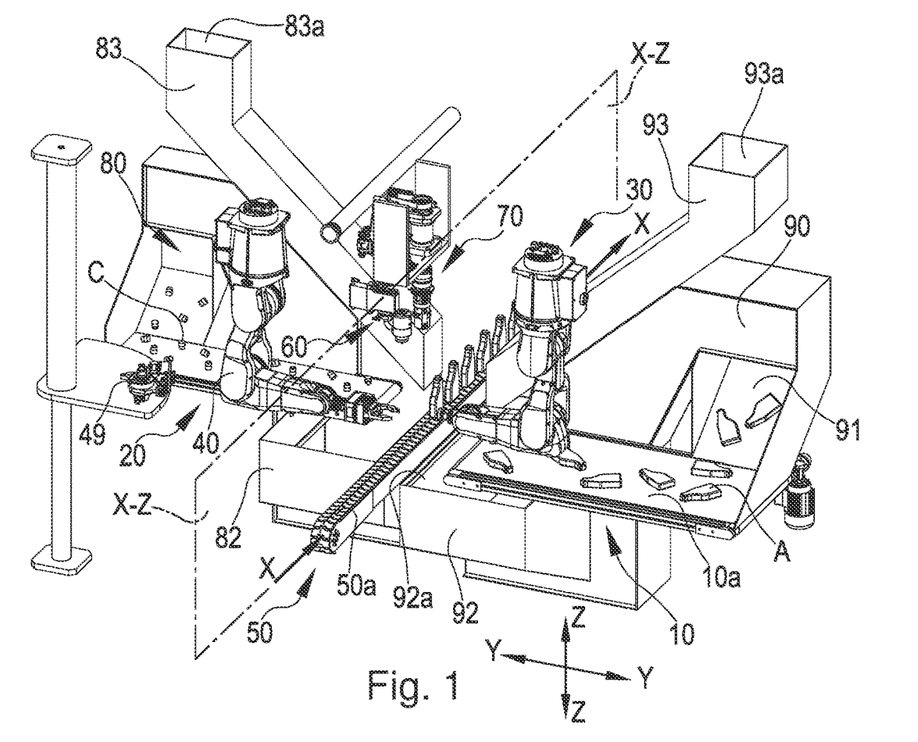
FIG. 1: shows a perspective view of a first example of an embodiment of a modular apparatus for filling and capping articles according to the present disclosure.
Figure 2:
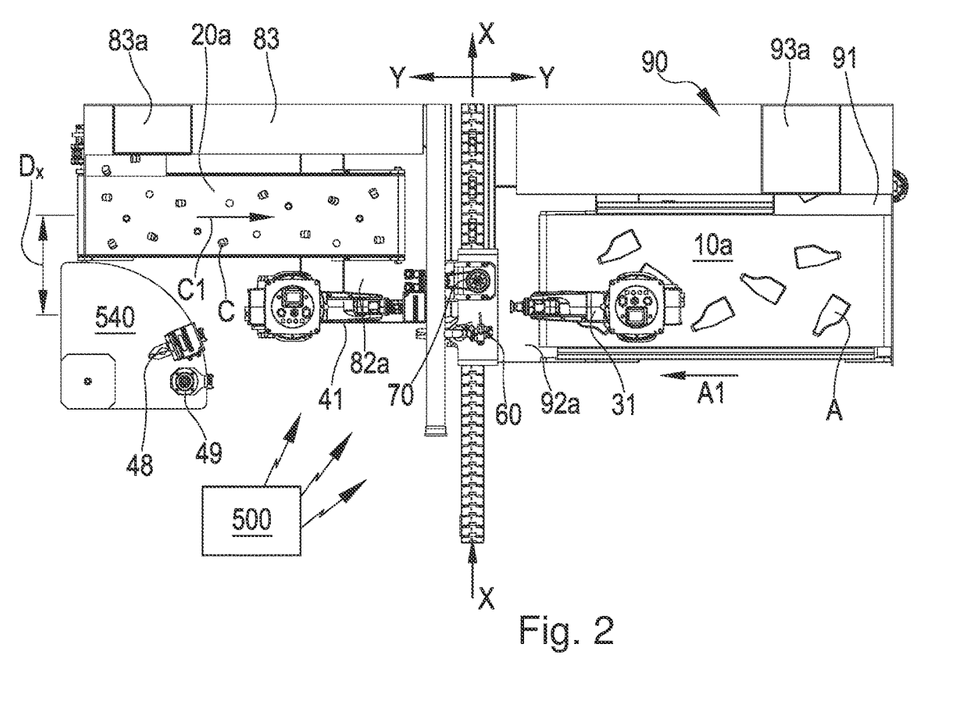
FIG. 2: shows a top plan view of the apparatus according to FIG. 1.

With reference to FIGS. 1 and 2, an example of an apparatus for filling and capping articles A, in particular containers, randomly fed to the input of the apparatus in which a pick and place device according to the disclosure is provided. The apparatus comprises a transport system 10 for transporting the articles A designed to transport said articles arranged randomly on a first transport plane 10*a* along a respective direction of transport A1; and a transport system 20 for transporting closing elements for closing the articles A, in particular caps C, designed to transport in a respective transport direction C1 said closing elements arranged randomly on a respective transport plane 20*a*.

An extraction system 50 is designed to transport the filled and capped articles along a longitudinal extraction direction X-X (conventionally assumed for the sake of convenience as being a lengthwise dimension of the apparatus) and in an extraction sense conventionally assumed as being from upstream to downstream.

In particular, the extraction system 50 comprises an extraction plane 50*a* for the filled and closed articles which is oriented parallel to the longitudinal direction X-X of extraction of the articles and to a transverse widthwise direction Y-Y of the apparatus and on which the filled and closed articles are transported, being arranged with a predefined orientation and/or position.

Figure 3:
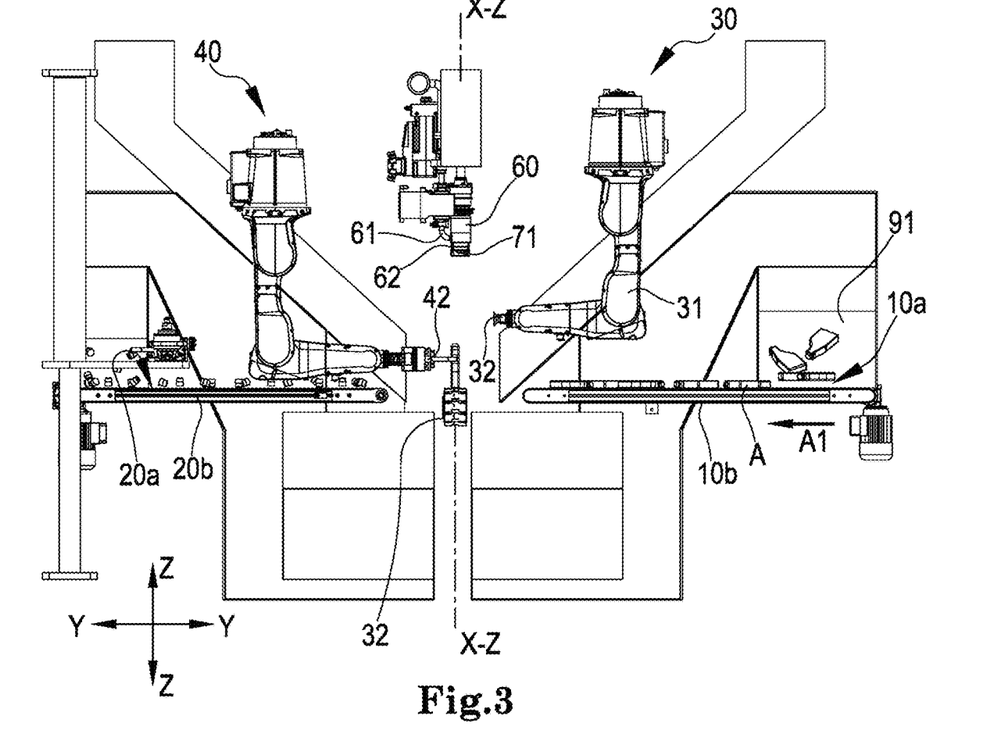
FIG. 3: shows a front view of the apparatus according to FIG. 1.

As shown in FIGS. 2 and 3, in the embodiment shown, the transport plane 10*a* for the articles A and the transport plane 20*a* for the closing elements C may be arranged on opposite sides of the extraction system, in particular on opposite sides in the transverse direction of a longitudinal-vertical plane X-Z (FIG. 3) parallel to the longitudinal extraction direction and to the vertical heightwise direction Z-Z and passing orthogonally through the extraction plane 50*a* of the extraction system 50. Owing to this configuration the filling and capping apparatus may be kept compact in the longitudinal direction.

With reference to FIGS. 1-3, a vertical heightwise direction Z-Z of the apparatus is also defined, assumed solely for the sake of easier description and without a limiting meaning as being orthogonal to the longitudinal extraction direction X-X and transverse widthwise direction Y-Y.

With reference still to FIGS. 1-3, the filling and capping apparatus according to the disclosure also comprises:
- a filling station 60 provided with means for filling the articles, in particular designed to feed and dispense a fluid or powder product into an open top mouth or opening of the container A in order to fill the same;
- a closing station 70 for closing the filled articles, provided with means 71 for applying a respective one of said closing elements C to the top mouth of a respective one of said filled articles A;
- at least one first pick and place device 30, arranged and configured to pick up articles A arranged randomly on the transport plane 10*a* and position them with a predefined filling orientation and/or in a predefined position for filling at the filling station 60;
- at least one second pick and place device 40, arranged and configured to pick up one of said closing elements from the plane 20*a* of the respective transport system and feed it to the application means 71 of the closing station 70;
- a detection system designed to detect the position and the arrangement of the articles A in transit on the transport plane 10*a* and of the closing elements C in transit on the respective transport plane 20*a* and make the information available for controlling the pick and place devices 30, 40.

The apparatus may also comprise a unit 500 for processing and controlling the components and the operating systems of the apparatus (only schematically shown in FIG. 2), for example configured to receive the detection signals made available by the detection system and consequently control the movement of the pick and place devices 30, 40.

The example of the modular apparatus comprises moreover gripping and positioning means configured and controlled to hold an article A in a filling position in the filling station, to displace a filled article A from the filling station 60 into a closing position in the closing station 70, to hold the article in the closing position during application of a closing element, and to displace a filled an closed article A' from the closing position in the closing station into a position and/or orientation for extraction on the extraction plane 50*a*.

Figures 4A, 4B:
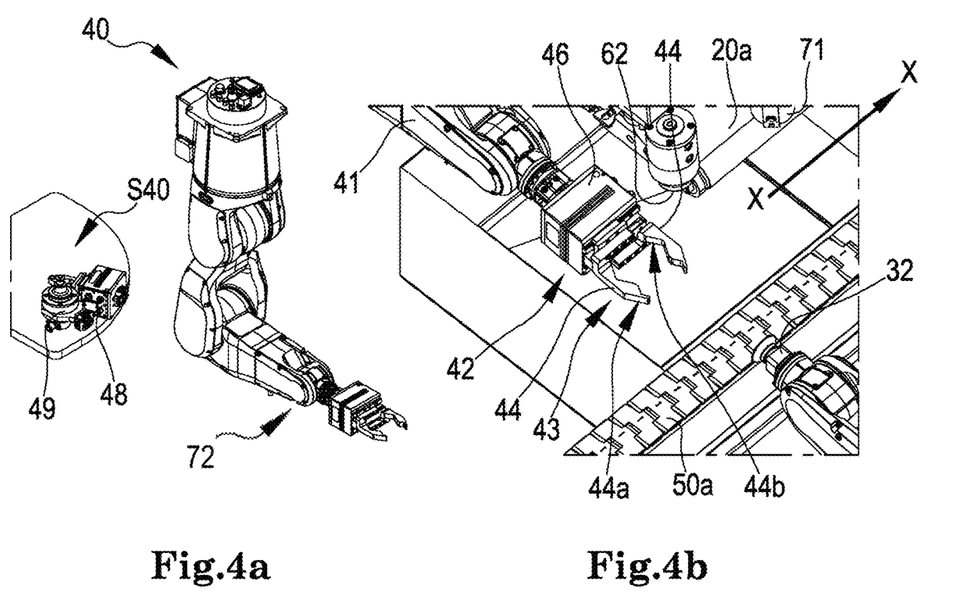
FIG. 4A: shows a perspective view of a pick and place device according to the present disclosure with a support for carrying replacement end means.
FIG. 4B: shows a detailed view of the gripping means of the pick and place devices of the apparatus according to FIG. 1.

With reference to FIGS. 4A and 4B, these show a pick and place device according to the present disclosure which may for example be used as a first pick and place device 30 or a second pick and place device 40 in the exemplary apparatus shown in FIGS. 1-3.

The device 40 according to the present disclosure comprises at least one robotic arm 41, a free end of which carries end means, in particular gripping means for gripping an article A and gripping means 42 for gripping a closing element C.

The at least one robotic arm 41 of the pick and place devices may be of the anthropomorphic type, in particular with at least five, or at least six, axes of rotation and/or degrees of freedom. The modular filling and closing apparatus ensures a high degree of automation and versatility during the picking up, orientation, and/or positioning of articles A and/or closing elements C with different forms, including asymmetrical forms. Indeed, an innovative aspect of the present disclosure is that what is sought after is not the maximum speed and efficiency during sorting of the articles or closing elements, such that simple and therefore fast-action pick and place devices may be used, but instead the maximum versatility of each modular apparatus when managing different volumes and production types; therefore the use of robotic arms of the type proposed allows greater versatility, even though the article processing speed may be penalized.

With reference to FIG. 4B some embodiments of the pick and place device 40 according to the disclosure are now described.

As shown, the device 40 comprises gripping means 42 arranged at the free end of a robotic arm 41.

The gripping means 42 may comprise a gripper 43 composed of two claws 44 arranged opposite each other and movable towards and away from each other in order to open and close the gripper 43.

In some embodiments, each claw 44 defines a first jaw 44*a* configured to form with the opposite first jaw 44*a* means for gripping a closing element and a second jaw 44*b* configured to form, together with the opposite second jaw 44*b*, means for gripping an article A. The two jaws will generally have different dimensions and/or a different form. In particular, each jaw 44*a*, 44*b* may be formed as a respective cavity directed towards the opposite jaw 44*a*, 44*b*, for example with a substantially parallelepiped or frustoconical or truncated pyramid form with a respective open larger base, situated opposite the other jaw.

Opening and closing of the gripper 43 may be adjusted to different positions by means of operating means, for example electric actuators 46 which control the movement of the claws 44 towards and away from each other. In some embodiments, the operating means 46 are also able to adjust the closing force of the gripper 43. In this way a servo gripper 43 mounted on the second pick and place device 40 is obtained, thus forming both the gripping means for picking up and feeding the closing elements to the closing station, and the gripping means which allow the pick and place devices to hold an article A in the filling position in the filling station and/or displace a filled article A from a filling station 60 into a closing position in a closing station 70 and/or keep the article in the closing position during application of the closing element, and/or displace a filled and closed article from a closing position in the closing station into a given position and/or orientation for extraction on the extraction plane 50*a*.

In some embodiments, one or more second pick and place devices 40 are realized in accordance with the present disclosure and configured to pick up a closing element C (in particular a cap) from the extraction plane 20*a*, re-orient it if necessary, and feed it with a certain orientation to the application means 71 of the closing station 70, where the closing element is received and stably held until an article A to be capped arrives.

Furthermore, in a particular manner the second pick and place devices 40 are also configured to carry out one or more, or all, of the following operations:

hold an article A in a filling position in the filling station for at least part of the product dispensing operation;

displace a filed article A from a filling station 60 into a closing position in a closing station 70;

hold the article in the closing position during application of the closing element;

displace a filled and closed article A' from a closing position in the closing station into a given position and/or orientation for extraction on the extraction plane 50*a;* discard the article should the control unit detect incorrect capping and/or filling.

In this way the need to provide specific means for holding and moving the containers in/between the filling and closing stations and from the latter to the extraction system is avoided, thus improving further the versatility of the modular apparatus.

Moreover, when it is one of the second pick and place devices 40 which performs one or more of the aforementioned operations, they free the first pick and place device 30, allowing it to pick up and re-orient a following article, while a preceding article is being filled, thus optimizing the processing time and ensuring that at, the end of filling, a following article to be filled is immediately ready. The fact that the application of the closing element is generally a more rapid operation than the bottle filling operation and that capping takes place in any case after filling is also exploited.

In the embodiment of a modular apparatus shown, the gripping means 32 of the robotic arm 31 of the first devices 30 are of the suction cup type, particularly effective for picking up containers A also with different forms, but it is clear that also the first pick and place devices 30 may be realized with end means in accordance with the present disclosure.

According to an aspect of the disclosure, the free end of one or more of the pick and place devices 30, 40, in particular of one or more of the robotic arms 41 of the second pick and place devices 40 may be configured to perform an automated replacement of the gripping means 43 arranged at the same end with a different end tool. In particular (FIG. 4A) the gripping means 43 may be replaced with gripping means 48 with a different format and/or size, adapted to different closing elements and/or articles A.

In addition or alternatively, the end means 43 may also be replaced with different end means which are not intended to grip the closing elements C and/or articles A, but are designed to perform a maintenance or format change-over operation on the modular apparatus.

In particular, these replacement end means may comprise a collector 49, for example in the form of a small cup, designed to be applied to the dispensing means of the filling station in order to collect a liquid for washing the product feeding and dispensing means of the filling station and convey it to a storage receptacle.

A support S40 may be arranged in a position accessible by the pick and place devices 40 and is designed to carry one or more of said replacement end means 48, 49. For example, the support S40 may be in the form of a tray and/or arranged in an outer position in the transverse direction Y-Y with respect to the robotic arm 41, in particular adjacent to the distal end of the associated transport plane 20*a* on which the arm is configured to act.

According to an example embodiment, the free end of one or more of the pick and place devices 30, 40, in particular of one or more of the robotic arms 41, 141 of the second pick and place devices 40, 140, is configured with interface means 72 for coupling/decoupling with/from the end means, allowing automated replacement of the end means.

In particular, the interface means 72 may be arranged so as to provide, once coupling has been performed, an electrical supply and/or a pneumatic supply to a respective one of the end means and/or to cooperate with complementary coupling/decoupling means arranged on the tray S40, for example comprising a support, provided with interface means 72, which engages and retains the end means, facilitating coupling or decoupling thereof with/from the interface means 72 of the robotic arm.

Therefore, a further improved flexibility, versatility and degree of automation of the modular apparatus is obtained.

Further aspects may be deduced from the following description of the example of a modular filling and closing apparatus which includes one or more pick and place devices according to the present disclosure, provided with reference still to FIGS. 1-3 and assuming a set of reference axes respectively in a longitudinal lengthwise direction corresponding to the direction of extraction of filled and capped containers along the extraction plane, transverse widthwise direction Y-Y of the apparatus, orthogonal to said longitudinal direction, and vertical heightwise direction Z-Z of the apparatus, orthogonal to the other two directions, as well as an upstream part and a downstream part opposite each other in the longitudinal extraction direction.

"Modular" is understood as meaning that the apparatus forms as a whole a filling and closing unit which can be controlled independently, even if formed by a variety devices and groups and/or even if the extraction system is shared with other modular apparatus.

In particular, each modular apparatus can be controlled so as to perform autonomously a cycle for filling and closing randomly fed articles by means of closing elements and/or is configured so that it can be added to/removed from a packaging plant substantially as a stand-alone unit and without substantially influencing the remaining structure of the plant.

The modular filling and closing apparatus according to the disclosure may be combined with a further similar filling and capping apparatus arranged upstream or downstream thereof in the longitudinal extraction direction, so as to construct a filling and capping plant of the modular type in which each apparatus according to the disclosure forms or comprises one module of a plurality of filling and capping modules arranged in series along the longitudinal extraction direction X-X and designed to deposit the filled and capped articles on a same extraction plane 50a.

The transport system 10 for the containers may be of any type designed to transport articles arranged randomly on a transport plane. In the example shown in FIGS. 1-3, the system 10 for transporting the articles A comprises a conveyor belt 10b, the top surface of which defines the support and transport plane 10a through the apparatus for the containers A randomly fed by an assembly 90 for feeding the containers A.

The belt 10b moves along a first direction and sense A1 of advancing movement which may be directed at an angle, such as between 80° and 100°, with respect to the longitudinal direction of extraction X-X and in a sense directed towards the plane 50a of the extraction system. One arrangement of the transport system 10 is such that the transport plane 10a and the direction A1 of advancing movement are oriented so as to be substantially orthogonal to the longitudinal extraction direction X-X and therefore parallel to the transverse direction Y-Y. This allows among other things the maximum longitudinal compactness and facilitates the arrangement of an article feeding assembly 90 and of the pick and place devices 30.

The article feeding assembly 90 is designed to randomly feed empty articles A towards the transport plane 10a. In the example shown, the assembly 90 comprises a chute 91, a bottom end of which is arranged so as to cause containers A to fall onto the transport plane 10a in the vicinity of an end thereof which is distal from the extraction plane in the direction and sense of advancing movement A1 and in any case upstream of the detection means of the detection system. The chute 91 is supplied by a storage receptacle 92 to which the empty containers A are fed by means of a duct 93 with an inlet hopper 93a. In some embodiments, the storage receptacle 92 is arranged in a position situated below, in the vertical direction Z-Z, the container transport plane 10a and such that the containers A which are not picked up by the pick and release devices 30 fall into the storage receptacle 92 at the end of their travel movement along the transport plane 10a. In particular, the storage receptacle 92 may be arranged in a position situated below a terminal end of the plane 10a, between the plane 10a itself and the extraction system 50 and have an open mouth 92a for receiving the containers which fall at the end of their travel movement on the plane 10a.

This configuration facilitates recirculation of the containers not picked up by the pick and place devices 30, together with the further containers A fed to the apparatus. In the context of the modular apparatus according to the disclosure, a high degree of picking up and positioning efficiency by the pick and place devices 30 may in particular not be required, the versatility and automation of the apparatus being more important; therefore, an efficient system for recirculating the containers A is one aspect of the disclosure such that the devices 30 may for example be configured to pick up only the containers A arranged on the plane with one or more predefined orientations, for example with a certain predefined visible flank. In some embodiments, a "porter" system (not shown) transports the containers A from the storage receptacle 92 to the chute 91, causing them to travel from a level below the transport plane 10a to a level above the same where they are released to the chute 91. In some embodiments, the porter system is configured to separate the containers A during transportation, for example by means of vibrating trays. The porter system may be used-since it allows a very regular flow of articles to the chute 91; other transport systems are however feasible and are known in the sector.

The transport system 20 for the closing elements C may be of any type designed to transport products arranged randomly on a transport plane. In the example shown in FIGS. 1-3, the transport system 20 comprises a conveyor belt 20b, the top surface of which defines the support and transport plane 20a through the apparatus of the closing elements C, in particular caps for bottles, which are randomly fed by an assembly 80 for feeding closing elements, described further below.

The belt 20b moves along a respective direction and in a sense C1 of movement, which may be oriented at an angle, such as between 80° and 100°, with respect to the longitudinal extraction direction X-X and in a sense directed towards the plane 50a of the extraction system. In particular an arrangement of the transport system 20 such that the transport plane 20a and the direction C1 of advancing movement are oriented so as to be substantially orthogonal to the longitudinal extraction direction X-X and therefore parallel to the transverse direction Y-Y allows maximum longitudinal compactness and facilitates the arrangement of the container feed assembly 80 and of the pick and place devices 40 for the closing elements.

According to one embodiment, the transport plane 10a for the containers A and the transport plane for the closing elements C are oriented at a same angle, in particular at right angles, with respect to the longitudinal direction X-X (measured on opposite sides of the extraction system) and, for instance, axially offset in the same direction by a certain distance Dx (FIG. 2).

The assembly 80 for feeding closing elements is designed to feed randomly closing elements C to the transport plane 20a. In the example shown, the assembly 80 comprises a chute 81, a bottom end of which is arranged so as to cause closing elements C to fall onto the transport plane 20a in the proximity of an end thereof distal from the extraction plane 50a in the direction and sense of advancing movement C1 and in any case upstream of detection means of the detection system. The chute 81 is supplied by a storage receptacle 82, to which the empty closing elements C are fed by means of a duct 83 with an inlet hopper 83a. In some embodiments, the storage receptacle 82 is arranged in a position situated below, in the vertical direction Z-Z, the transport plane 20a for the closing elements and such that closing elements C not picked up by the pick and place devices 40 fall into the storage receptacle 82 at the end of their travel on the transport plane 20a. In particular, the storage receptacle 82 may be arranged in a position situated below a terminal end of the plane 20a, between the plane 20a itself and the extraction system 50, and have an open mouth 82a for receiving the closing elements which fall at the end of their travel on the plane 20a.

This configuration facilitates recirculation of the closing elements not picked up by the pick and place devices 40, together with the further closing elements C fed to the apparatus. In connection with the modular apparatus of the disclosure a high pick-up and positioning efficiency of the devices 40 may not in particular be required, the versatility and automation of the apparatus being more important. It is one aspect of the disclosure to have an efficient system for recirculation of the closing elements C such that the pick and place devices 40 may be for example configured to pick up only closing elements C arranged on the plane 20a with one or more predefined orientations, for example with the closed top surface visible, or vice versa. In some embodiments, a "porter" system (not shown) transports the closing elements C from the storage receptacle 82 to the chute 81, causing them to travel from a level below the transport plane 20a to a level above the same where they are released to the chute 81. In some embodiments, the porter system is configured to separate the closing elements C during transportation, for example by means of vibrating trays. Other transport systems are feasible and known in the sector.

It may be that the system 80 for feeding the articles and/or the feeding assembly 90 for feeding the closing elements, in particular the chute 81, 91 and/or the porter system and/or the duct 83; 93 is/are arranged downstream in the longitudinal direction X-X of the respective first planes 10a, 20a of the transport systems 10, 20, as will become clearer below.

A filling station 60 is configured to fill with a product, such as a fluid or for example a powder product, the inside of an article A arranged in a filling position in the station 60.

The filling station 60 may in particular be configured with means for feeding the product such as ducts 61, and means for dispensing the product inside the container A, for example a nozzle 62 which can be operated to open and close so as to dispense a predetermined quantity of product. The filling position is generally such that the article A to be filled is arranged in a position situated below, in the vertical direction Z-Z, the dispensing means 62.

According to one embodiment, the respective transport planes 10a, 20a for the articles A to be filled and for the closing elements C are arranged on opposite sides, in the transverse direction Y-Y, at least of the dispensing means 62 of the filling station 60.

In particular, the dispensing means 62 and therefore the filling position may be located substantially above the extraction plane 50a and/or in a position such as to be intersected by said longitudinal-vertical plane X-Z. This facilitates and speeds up considerably the operations involving positioning of the articles and the caps by the pick and place devices 30, 40 and also the positioning of the filled articles on the extraction plane 50a and at the same time allows the modular structure of the apparatus to be fully exploited.

A closing station 70 of a modular filling and capping apparatus according to the disclosure is configured to receive a closing element C, hold it until a filled article A arrives in a closing position in the closing station 70 and apply it to a top mouth or neck of the article A in order to perform closing of the filled article.

For this purpose, the closing station 70 may comprise means 71 for holding and applying a closing element C, such as a cap for a container, in particular comprising chuck means designed to receive the closing element C and apply it, for example by means of rotation or pressure, onto the neck of a container. These holding and application means, as well as other similar devices, are known in the sector and are not described in detail and may vary depending on the type of closing element and container being processed.

The closing position is generally such that the article A to be filled is arranged in a position situated below, in the vertical direction Z-Z, the application means 71.

According to one embodiment, the feeding planes 10a, 20a, respectively, of the articles A to be filled and of the closing elements C are arranged on opposite sides, in the transverse direction Y-Y, of the closing station 70, in particular at least of the holding and application means 71.

In particular, the holding and application means 71 and therefore the closing position may be located substantially above the extraction plane 50a and/or in a position such as to be intersected by said longitudinal-vertical plane X-Z. This facilitates and speeds up considerably the operations involving positioning of the articles and the caps by the pick and place devices 30, 40 and also the positioning of the filled articles on the extraction plane 50a and at the same time allows the modular structure of the apparatus to be fully exploited.

The closing station 70 may be arranged downstream, in the longitudinal extraction direction X-X, of the filling station 60, but it is clear to the person skilled in the art that these position may also be reversed.

The filling and closing stations may be arranged adjacent, in particular substantially aligned along the longitudinal extraction direction X-X.

According to the embodiment shown (FIG. 3) the first pick and place device 30 and the second pick and place device 40 are arranged on opposite sides of the extraction system, in particular on opposite sides, in the transverse direction, of the longitudinal-vertical plane X-Z parallel to the longitudinal extraction direction and to the vertical heightwise direction Z-Z and passing orthogonally through the plane 50a of the extraction system 50. In particular said devices may be arranged at the respective transport plane 10a for the articles or transport plane 20a for the closing elements, where a respective area of action of each of the pick and place devices for picking up the respective articles A or closing elements C is defined.

In some embodiments, the first pick and place device 30 and the second pick and place device 40 are arranged on opposite sides, in the transverse direction Y-Y, of the filling station, in particular of the dispensing means 62 and/or of the closing station 70, in particular at least of the holding and application means 71.

In some embodiments, the first pick and place device 30 is configured to pick up an article A from the plane 10a, re-orient it if necessary, position it with a certain orientation in the filling position in the filling station 60 and hold the article A in the filling position in the filling station for a predefined time interval, in particular until further gripping and positioning means have taken it up before, during or after dispensing of the product by the dispensing means 62 of the station 60.

An extraction system 50 extends in the longitudinal extraction direction X-X and is designed to transport the filled and capped articles, arranged with a predefined orientation and/or position along an extraction plane 50a which extends along the longitudinal direction X-X and in an extraction sense conventionally assumed to be from upstream to downstream.

In greater detail, the extraction plane 50a is able to receive the filled and closed articles A' and extract them from the apparatus along the extraction direction. The articles A' are in particular released by the gripping means which have been configured to move a filled and closed article from a closing position in the closing station 70 into a given position and/or orientation for extraction on the extraction plane 50a, these gripping means may be mounted on the second pick and place devices 40.

The extraction system may in particular comprise a conveyor belt 50b which is operated by an associated actuator and the top surface of which defines the extraction plane 50a. As shown, the conveyor belt 50b may be arranged in a substantially central position in the transverse widthwise extension direction Y-Y of the machine, with the transport systems 10, 20 and the feeding systems 80, 90 and/or the first and second pick and place devices 30, 40 arranged on opposite sides, in the transverse direction, of the extraction belt 50*b*.

In some embodiments, the extraction plane 50*a* is not coplanar with the closing element transport plane 20 and/or the plane 10*a* for transporting the articles A, this being one method for facilitating the movement trajectories of the robotic arms 31, 41. This extraction plane may however be coplanar also with one or both the closing element transport plane 20*a* and article transport plane 10*a*. The extraction plane may be also only theoretical, for example in the case of extraction systems with movable grippers or cups which hold the filled articles and move them suspended along an extraction direction.

The transport planes 10*a*, 20*a* and extraction plane 50*a* may also be parallel.

A particular embodiment of the sorting apparatus according to the disclosure is that in which the extraction system comprises a support plane 50*a* for the containers released by the pick and place devices 40 which is arranged substantially equidistant from the container transport plane 10*a* and from the closing element transport plane 20*a*. This allows the movements of the pick and release robots 31; 41 which are associated with the respective first transport plane 10*a*, 20*a* to be managed more simply. The apparatus according to the disclosure is, however, not strictly limited in this sense, it being possible to arrange the extraction system at a different distance from the first transport planes 10*a*, 20*a*.

As regards the position for deposition of the filled and capped articles A' on the extraction plane 50*a*, according to a particular aspect of the present disclosure, said position is one of a plurality of predefined positions spaced from each other at a constant interval P along the extraction direction X-X.

According to this embodiment, the apparatus is configured so that a plurality of consecutive positions are defined on the extraction plane 50*a* spaced from each other at a constant interval P, and the pick and place devices for holding and positioning filled and capped articles on the extraction plane 50*a* are controlled to place the filled and capped article A' in one of said predefined positions and, if required, with a predefined priority.

In this context it is not necessary for all the successive predefined positions to be occupied by an article A' to be extracted, but only that the position for release to the extraction system should be one of the predefined positions.

This control operation may in particular be performed by the processing unit 500, as will emerge more clearly below.

This configuration facilitates coordination of extraction of the filled and closed articles A' by various modular apparatus arranged in series along the extraction direction on a same extraction plane 50*a*. Indeed it will be sufficient for each modular apparatus to be controlled so as to deposit the articles A' to be extracted in one of the predefined positions not occupied by an article A' filled and capped by a modular upstream apparatus. In particular, the processing and control units 500 of each modular apparatus (which may also be formed as a suitably configured processing unit) may perform the release of the filled and capped articles to the extraction belt 50*b* depending on a predefined arrangement for occupation of said predefined extraction positions (e.g. leaving free one position out of every two, three or more positions for the following modular apparatus situated downstream).

Moreover, the processing unit will have knowledge of the advancing position in the extraction direction X-X of all the filled and capped articles, thus being able to make said information available both for any downstream operating machines (for example labelling machines) and for following downstream modular filling and capping apparatus, which may in this way be controlled so as to deposit the associated filled articles in a predefined "empty" position not occupied by an article A' extracted by one of the upstream modular apparatus. A predefined rule for deposition of the articles A' to be extracted will therefore not be necessary.

In any case the extreme versatility of the modular apparatus according to the disclosure is evident, allowing for example a higher production volume to be obtained with a first upstream modular apparatus, which on average will occupy for example three positions out of every four successive extraction positions on the extraction plane 50*a*, while a following downstream modular apparatus will be able to realize the production of articles A' which require a greater filling time or for which a smaller production volume is required, occupying one position out of every four positions, which is left free on the extraction plane of the upstream apparatus.

If it is desired to increase the volume of the second production it is possible simply to control the first upstream apparatus so as to occupy only two positions out of every four positions on the extraction plane, freeing one more position for the downstream filling apparatus.

It will be clear to the person skilled in the art that this general concept may be adjusted and adapted to a variety of production types, configurations of apparatus and number of modules or modular filling and capping apparatus arranged in series.

An example of a detection system may comprise at least a first and second camera (or other suitable image acquisition device) each arranged so as to frame a respective transport plane 10*a*; 20*a* upstream in the direction of advancing movement A1, C1 of an action area, on the respective plane, of the respective first/second pick and place devices 30, 40.

Each camera may be designed to record the position and arrangement of the containers A or closing elements C in transit on the respective transport plane within its viewing field, making the information available for controlling the operation of the respective pick and place devices 30, 40. Cameras of this type are known in the sector of sorting machines and are not described in greater detail In some embodiments, the detection system also comprises means for backlighting one or both the transport planes 10*a*, 20*a*, allowing the image acquired by a first or second camera to be improved.

The detection system 60 may additionally comprise means 63 for measuring the advancing movement of the transport plane 10*a*; 20*a* of one and/or the other transport system 10, 20, for example comprising an encoder 63 associated with means for moving the belt 10*b*; 20*b* which form the plane 10*a*; 20*a*.

The processing and control unit is in particular at least configured to receive the information from the detection system and to control consequently the pick and place devices. Moreover, it may control the positioning of the filled articles A' to be extracted and/or store information relating to their position on the extraction plane.

In the presence of several modular apparatus, the processing unit may be a single one for all the apparatus, it may incorporate a plurality of processing units each designed to control a respective apparatus, and there may be provided a coordinating unit, which manages and coordinates the single processing units of each modular apparatus, or a combination of such configurations. The realization of such a processing unit or coordinating unit on the basis of the teachings of the present description is within the competence of the person skilled in the art.

With this configuration and as shown in FIGS. 5A-F the operating principle of the modular filling and capping apparatus may be as follows:

- the containers A picked up from the storage receptacle 92a are randomly fed to the transport plane 10a which transports them in the direction A1 within the viewing range of a camera of the detection system, which detects the position and orientation thereof on the plane itself—for example defined by the orientation of the front and rear end faces and/or by the position of its two side faces which are respectively hidden resting on the belt 10b and visible on top—transmitting the information to the processing and control unit 500;
- the control unit 500, if necessary correlating this information with the information measuring the advancing movement of the belt, commands the operation of the first robotic arm 31 which is authorized to pick up, for example, only the containers which have a certain first orientation on the transport plane, while allowing instead the other containers to pass by;
- the first robot 31 picks up (FIG. 5A) by means of its gripping means 32 a selected container A and manipulates it so as to bring it into the filling position in the filling station (FIG. 5B) with a predetermined orientation, for example with neck erect and filling opening in a top position and front end face correctly directed in the predefined sense for extraction downstream;
- dispensing of the product inside the container A by the dispensing means 61 of the filling station 60 is started;
- simultaneously, the closing elements C are randomly fed to the transport plane 20a, their position and orientation is detected by the detection system and the second pick and positioning device 40 is controlled (FIG. 5A) so as to pick up a selected closing element C and feed it (FIG. 5B) to the application means 71 of the closing station 71, which stably hold it;
- once the closing element has been released to the closing station 70, the second pick and place device 40 positions (FIG. 5C) the associated gripping means 43, in particular the internal jaws 44b, so as to grip the container A arranged in the filling position for receiving the product in the filling station 60, freeing the robot arm 31 of the first pick and positioning device (FIG. 5D) which may move to pick up (FIG. 5E) a new container A from the transport plane 10a. The aforementioned operations may take place even before filling is performed or during filling;
- once filling has been completed, the pick and place devices 40 move the filled container A from the filling station to the closing position underneath the means 71 for application of the closing element C, inside the capping station (FIG. 5E);
- the application means 71 apply, for example by means of screwing or pressure, the closing element C to the top mouth of the filled container A, held in the closing position by the gripping means 43 of the second robotic arm 41;
- in the meantime, the first robotic arm 31 has picked up and re-oriented a new article A to be filled by positioning it (FIGS. 5E, 5F) in the filling position in the filling station;
- once application of the closing element C has been completed, the second robotic arm 41 moves the filled and closed article A' from the closing station into an extraction position on the extraction plane 50a, releasing the article by means of opening of the jaws 44b of the gripping means 43, for transportation in the longitudinal direction X-X by the extraction plane 50a;
- the second robotic arm 41 is now free to pick up a new closing element and feed it to the closing station 70 for capping the next article A already fed to the filling position by the first robotic arm 31.

Figure 5A:
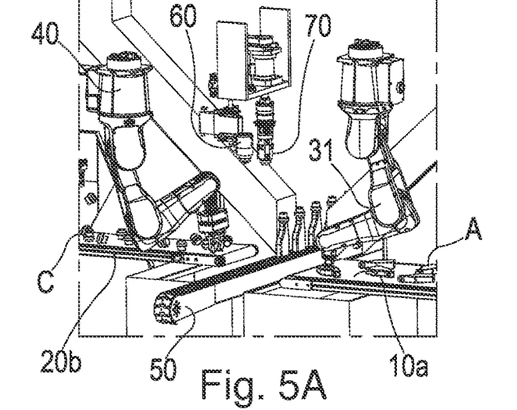
FIGS. 5A-5F: show perspective views of an example of a filling, capping and extraction cycle performed by the apparatus according to FIG. 1.
Figure 5B:
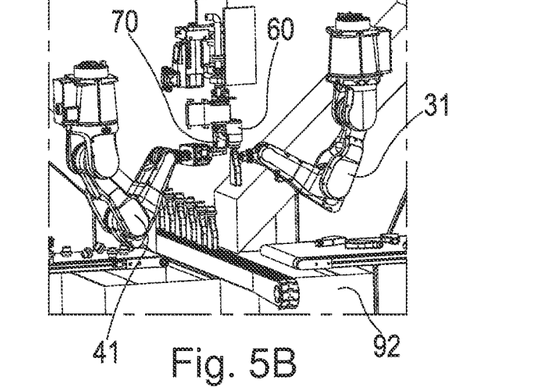
Figure 5C:
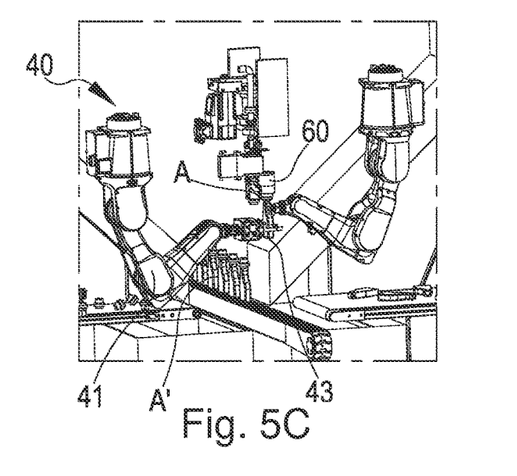
Figure 5D:
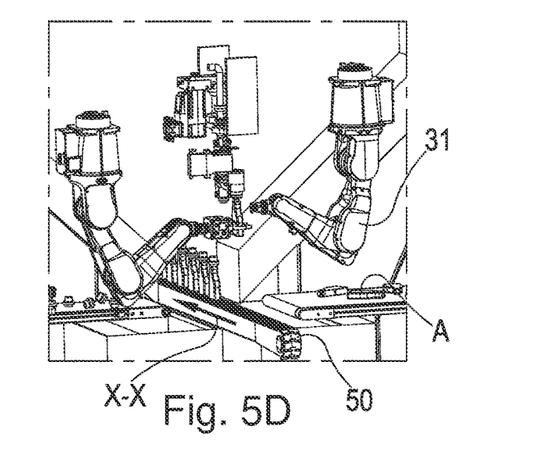
Figure 5E:
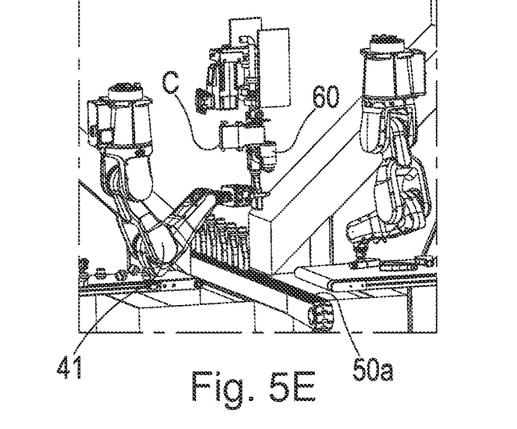
Figure 5F:
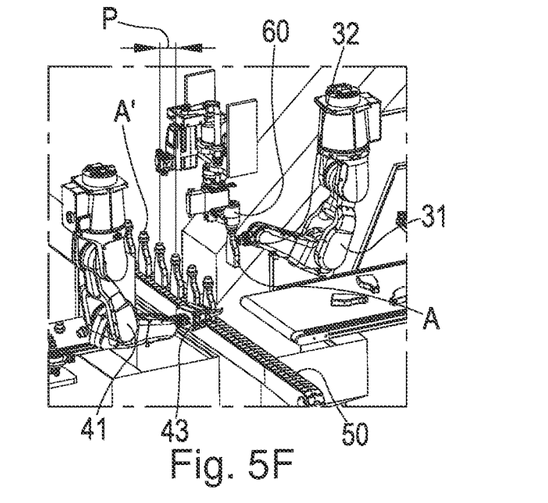

As shown in FIG. 5F, the containers A' being extracted on the extraction plane may be arranged in a respective position of a plurality of predefined extraction positions which are spaced from each other at a constant interval P.

By means of the processing unit 500, the spacing interval P of said predefined positions may be easily varied depending on the different production and configuration requirements of the plant, without structural alterations. This interval may also not be strictly constant, but comply for example with a certain periodic rule.

It is therefore clear how, with a modular apparatus configured with one or more pick and place devices according to the disclosure, it is possible to realize plants with different capacities for sorting, filling and capping articles such as containers to be filled with a liquid, using always a same modular structure of the filling and capping apparatus and simply combining a suitable number of these apparatus in series along the extraction direction in order to obtain the desired production capacity. Likewise it is possible to vary the capacity of a plant which includes an apparatus according to the disclosure which has previously been installed by simply adding (or removing) further filling and capping modules upstream and downstream thereof in the longitudinal direction.

Also in connection with plants which have already been installed, it is also possible, owing to the modular structure of the apparatus according to the disclosure, to vary the production capacity of the plant depending on the actual needs by operating only one or more of the filling and capping modules which are independent of each other; alternatively or in combination it is also possible to perform different types of production using the various filling and capping modules arranged along the same extraction line.

The invention claimed is:

1. An apparatus for filling and closing randomly fed articles, by means of randomly fed closing elements, wherein the apparatus includes one or more pick and place devices, each pick and place device comprising a robotic arm, a free end of which carries end means, wherein the end means comprise a first gripping means for gripping a closing element and a second gripping means for gripping an article;

the apparatus further comprising:
a system for transporting articles, designed to transport the articles arranged randomly on at least one first transport plane along a respective direction for transporting articles;
a system for transporting closing elements, designed to transport closing elements, arranged randomly on at least one first plane for transporting closing elements, in a respective direction of transport;
a filling station, configured to supply and dispense a product inside one of said articles arranged in a filling position;

a station for closing the filled articles, provided with means for applying in each case one of said closing elements onto one of said filled articles so as to close it;

an extraction system for transporting the filled and closed articles with a predefined orientation and/or position along an extraction plane in a longitudinal direction of extraction from upstream to downstream;

one or more first pick and place devices arranged and configured to pick up articles arranged randomly on the at least one first transport plane for transporting articles and to position them with a predefined orientation and/or in a predefined position at the filling station;

one or more second pick and place devices comprising at least one pick and place device comprising the robotic arm, the free end of which carries end means, wherein the end means comprise the first gripping means for gripping the closing element and the second gripping means for gripping the article, arranged and configured to pick up one of said closing elements from the at least one first transport plane of the respective transport system and to feed it to the application means of the closing station by means of the first gripping means for gripping a closing element;

a detection system for detecting the position and/or the arrangement of the articles in transit on the at least one first transport plane and of the closing elements in transit on the respective at least one first transport plane and for making available the information for controlling the pick and place devices; and a processing and control unit for controlling a components and the operation of the apparatus.

2. The apparatus according to claim 1, wherein the end means comprise a gripper formed by a first claw and a second claw positioned opposite each other and movable towards and away from each other so as to open and close the gripper, wherein each of the first claw and the second claw defines: a respective first jaw configured to form with an opposite first jaw said first gripping means for gripping the closing element; and a respective second jaw configured to form with an opposite second jaw said second gripping means for gripping the article.

3. The apparatus according to claim 2, wherein opening and closing of the gripper can be adjusted to different positions by operating means for displaceably operating one or both of the first claw and the second claw.

4. The apparatus according to claim 2, wherein a closing force of the gripper is adjustable by operating means for operation of one or both of the first claw and the second claw.

5. The apparatus according to claim 1, wherein the free end of the robotic arm is configured to replace the end means with different end means, the pick and place device being controllable by means of a processing unit for performing replacement autonomously.

6. The apparatus according to claim 5, wherein the free end of the robotic arm is configured to replace the first gripping means with a collector, for collecting a washing fluid of a filling station, and/or with different gripping means able to define jaws of different sizes and/or forms for gripping and positioning a different article and/or closing element.

7. The apparatus according to claim 1, wherein the free end of the robotic arm is configured with interfacing means for coupling/decoupling with/from the end means, the interfacing means being configured to allow automated replacement of the end means and/or to provide an electrical supply and/or a pneumatic supply from the robotic arm to the end means.

8. The apparatus according to claim 1, wherein the pick and place device is programmed to perform, during use in a filling and closing apparatus, one or more of the following operations:

pick up the closing element arranged randomly on a transport plane and feed it to application means in a closing station;

hold the article in a filling position in a filling station;

displace the article filled by the filling station into a position for closing in the closing station;

hold the article in a closing position during application of the closing element;

displace the filled and closed article from the closing position in the closing station into a given position and/or orientation for extraction on an extraction plane.

9. The apparatus according to claim 1, wherein the second gripping means for gripping the article are formed by a pair of second jaws of a gripper of the pick and place device and are configured and controlled so as to hold the article in a filling position in a filling station and/or to displace the article filled by the filling station into a closing position in a closing station and/or to hold the article in the closing position during the application of a closing element and/or to displace a filled and closed article from the closing position in the closing station into a position and/or orientation for extraction on the extraction plane.

10. The apparatus according to claim 1, wherein the one or more first pick and place devices and the one or more second pick and place devices are arranged:

each at a respective plane for transporting articles or first plane for transporting the closing elements, on which a respective area of action of one of the pick and place devices is defined, and/or on opposite sides of the extraction system, parallel to the longitudinal direction of extraction and to a vertical heightwise direction and passing orthogonally through the extraction plane of the extraction system.

11. The apparatus according to claim 1, wherein the at least one first plane for transporting the articles and the at least one first plane for transporting the closing elements are arranged on opposite sides in a transverse direction of a longitudinal-vertical plane parallel to the longitudinal direction of extraction and to a vertical heightwise direction and passing orthogonally through the extraction plane for extraction of the articles; and/or wherein the first plane for transporting articles and a direction of advancing movement of the articles on the at least one first transport plane are oriented at an angle, between 80 and 100 degrees, with respect to the longitudinal direction of extraction and in a sense directed towards the extraction plane;

and/or wherein the at least one first transport plane for transporting the closing elements and a direction of advancing movement of the closing elements on the at least one first transport plane are oriented at an angle, between 80 and 100 degrees, with respect to the longitudinal direction of extraction and in a sense directed towards the plane of the extraction system.

12. The apparatus according to claim 1, wherein the filling station comprises dispensing means for dispensing the product inside the articles arranged in the filling position and wherein:

the first transport planes for transporting respectively the articles to be filled and the closing elements are arranged on opposite sides, in the transverse direction, of the dispensing means of the filling station; and/or the dispensing means and the filling position are located substantially above, in the vertical direction, the extraction plane and/or are intersected by a longitudinal-vertical plane passing orthogonally through the extraction plane.

13. The apparatus according to claim 1, wherein the closing station comprises means for holding and applying the closing element onto the filled article arranged in the closing position and wherein:

the first transport planes respectively for the articles to be filled and the closing elements are arranged on opposite sides, in a transverse direction, of the closing station, and the closing position; and/or the holding and application means and the closing position are located substantially above, in the vertical direction, the extraction plane and/or are intersected by a longitudinal-vertical plane passing orthogonally through the extraction plane.

14. The apparatus according to claim 1, wherein the detection system comprises at least a first and a second image acquisition device, each arranged so as to capture at least partially a respective transport plane for transporting the articles or the closing elements, upstream in the direction of advancing movement of an action zone on the respective plane of the respective first or second pick and place devices.

15. The apparatus according to claim 1, wherein the robotic arm is anthropomorphic with at least five or at least six axes of rotation and/or degrees of freedom.

* * * * *